United States Patent
Perkins

[11] 3,981,590
[45] Sept. 21, 1976

[54] OPTICAL SYSTEM TO OPTIMIZE FIELD OF VIEW UNIFORMITY IN A MULTI-COLOR PRODUCE SORTER

[75] Inventor: Joseph R. Perkins, Burke, Va.

[73] Assignee: AMF Incorporated, White Plains, N.Y.

[22] Filed: Aug. 28, 1975

[21] Appl. No.: 608,497

[52] U.S. Cl. .............................. 356/178; 209/111.6; 250/226; 250/227; 350/96 B; 356/189
[51] Int. Cl.² .......................................... G01J 3/50
[58] Field of Search ............ 356/178, 173, 186, 189, 356/195; 350/96 B; 250/227, 226; 209/111.6

[56] References Cited
UNITED STATES PATENTS

| | | |
|---|---|---|
| 2,759,601 | 8/1956 | Baigent ............................. 209/111.6 |
| 3,066,797 | 12/1962 | Fraenkel ........................... 209/111.6 |
| 3,244,894 | 4/1966 | Steele et al. ........................ 250/227 |
| 3,707,030 | 12/1972 | Hunter ................................ 356/186 |
| 3,770,111 | 11/1973 | Greenwood et al. ......... 209/111.6 X |
| 3,885,878 | 5/1975 | Ishak ............................. 250/227 X |

Primary Examiner—John K. Corbin
Assistant Examiner—F. L. Evans
Attorney, Agent, or Firm—George W. Price; John H. Gallagher

[57] ABSTRACT

An optical system for use on produce graders to enhance intensity and uniformity of reflected light directed onto color detectors.

9 Claims, 3 Drawing Figures

OPTICAL SYSTEM TO OPTIMIZE FIELD OF VIEW UNIFORMITY IN A MULTI-COLOR PRODUCE SORTER

BACKGROUND OF THE INVENTION

In the automatic grading of agricultural produce such as tomatoes and apples for example, the articles of produce are moved in alignment along a conveyor and past an inspection station where they are automatically graded and then sorted according to some desired characteristic of the produce. Quite commonly the basis for grading is the color of the articles and the grading decision is based on the comparison of two or more electrical signals which are functions of respective color components of light which are reflected from the articles onto photoelectric detectors. This general method of grading agricultural products is well known and need not be further described.

In sorting articles of produce according to color, the grading classification will include a given range of color and intensity variations. The optical system associated with the photodetectors of the color grader must be good enough that the variation in color and intensity of light reflected from a single article and transmitted through the optical system is well within the range of variations established for grading the particular produce.

In a moving conveyor type of produce grader the high speed of movement of the articles through the field of view of the detectors, the variation in sizes of the articles, the vibration and sometimes rolling of the articles on the conveyor all cause the viewing distance and viewing angle to vary as the articles pass through the field of view. These variable factors have in the past caused significant variations in the color and intensity of light transmitted by the optical system and received by the color detectors. The result has been that the detectors have produced inconsistent signals, thus causing the electronic grading equipment to compare color signals which were not truly representative of the color components of the article being viewed at a given instant of time.

One type of optical system used in the past to direct reflected light onto a plurality of spaced color detectors was comprised of an objective lens, a field stop, and a field lens, wherein the field lens was intended to present equally to two or three spaced apart color detectors the light from the field of view which enters the objective lens from objects in the field of view. That is, the field lens focused the image of the clear aperture of the objective lens onto the detectors. However, if the article being viewed were not exactly in focus at the field stop during any part of its travel through the field of view, the possibility existed that not all the detectors would be equally illuminated. Additionally, as the object moved across the field of view of the lens system, the angle of the light reflected back to the optic system constantly changed so that it was possible that all the detectors did not receive the same amount of light even if the object were in focus. The nonuniform illumination of the detectors gave rise to the generation of erroneous color component signals and resulted in erroneous grading.

BRIEF DESCRIPTION OF THE DRAWINGS

The present invention will be described in conjunction with the accompanying drawings wherein.

DESCRIPTION OF PREFERRED EMBODIMENT

Figure 1:
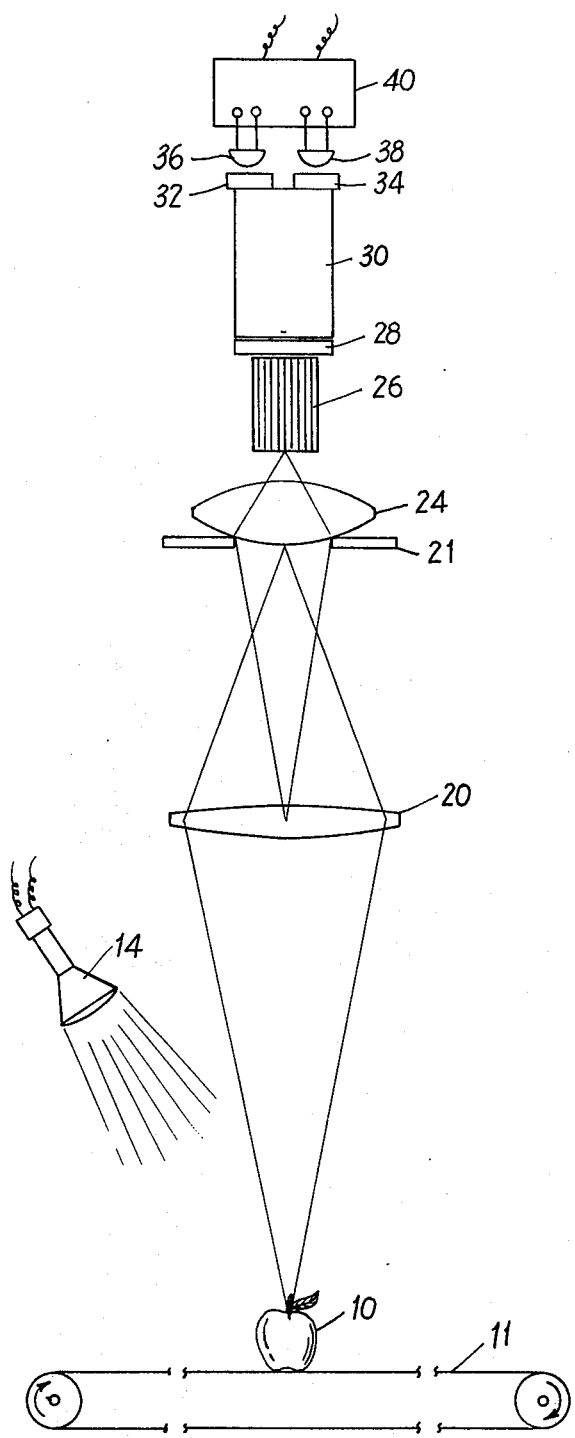
FIG. 1 is a simplified sketch illustrating the present invention.

Referring now in detail to the simplified illustration of FIG. 1, an article of produce 10, such as an apple or tomato, is moved along a conveyor 11 and within the field of view of detection apparatus 12. Polychromatic light from illuminating source 14 is directed onto article 10 and is reflected upwardly to the optical system of this invention. The reflected light passes through objective lens 20 which focuses the image of object 10 at or near the plane of stop 21 which defines the field of view on conveyor 11. A field lens 24 focuses the clear aperture of the objective lens 20 onto the end of a bundle of thin fiber optic light guides 26. The clear aperture of objective lens 20 is the area of the lens through which light passes without interference from the lens mounting. Light propagating through fiber optic bundle 26 is incident on a diffusion plate 28. Light emitting from the back side of diffusion plate 28 passes through a light pipe or guide 30, such as a translucent plastic rod, and is incident on color filters 32 and 34. More than two color filters and photodetectors could be used, but in this example it will be assumed that only a red and a green filter are employed. The red and green color components of light passing through filters 32 and 34 are incident on respective photodetectors 36 and 38, each of which responds to the incident light to produce an electrical signal whose magnitude is a function of the amount of its respective incident colored light.

The color signals produced by photodetectors 36 and 38 are coupled to electronic apparatus 40 which compares and otherwise operates on the color signals in accordance with predetermined grading criteria to assign a grade or classification to the article 10. Electronic apparatus 40 may include means for actuating sorting apparatus which physically displaces article 10 to an assigned bin or conveyor in accordance with its grade. Sorting apparatus for accomplishing the physical displacement of articles is well known. Since it does not comprise a part of the present invention it will not be further described.

The combination of the fiber optic bundle and the diffusion plate has been found to greatly enhance the total transmission of light to the photodetectors and has greatly enhanced the uniformity of the light incident on the spaced color filters as the article 10 moves through the field of view. The advantage realized by the use of the fiber optic bundle and the diffusion plate may be better appreciated by first considering how the optical system would function without the fiber optic bundle.

Because of practical considerations which will be mentioned below, it is necessary to use diffuser plates that are considerably less than perfect diffusers. One consequence of this is that if the article on the conveyor is not in focus at the plane of the field stop, it is possible that light passing through the less than perfect diffuser will not equally illuminate all of the spaced detectors. This produces erroneous output signals from the photodetectors and results in erroneous grading of the produce. Furthermore, when the object 10 is near the edges of the field of view, the colored light reflected from the object would be incident on the objective lens 20 at an angle to the axis of the optic system. This also means that the light after passing through the field lens would be incident on the diffuser plate 28 at an angle. Because practical diffuser plates used in commercial applications such as produce graders are not perfect diffusers and therefore do not produce an ideal spherical illumination pattern, the light emitted from the diffuser plate still will be at an angle to the optic axis and would in all probability not equally illuminate the two or more spaced color filters 32 and 34 even if the article in the field of view were in focus. The angle of incidence and angle of exit of the light from the diffuser plate 28 would change as the object 10 moved through the field of view so that the illumination of the color filters would change as the object moved through the field of view. This of course would cause the respective component color signal outputs of the photodetectors 36 and 38 to change as the object moved through the field of view and could result in erroneous grading of the article.

Attempts to overcome the above problem by employing diffuser plates having greater diffusing ability have proved unsuccessful because a diffuser plate which had sufficient diffusing ability to produce a more spherical diffusion pattern attenuated the transmitted light to such an extent that the color detectors 36 and 38 did not receive enough light for reliable operation.

Figure 2:
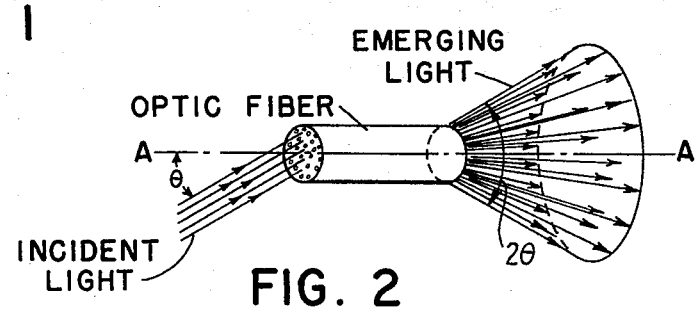
FIG. 2 is an illustration of the light conducting properties of a thin optic fiber.

The enhanced intensity and uniformity of illumination achieved with the arrangement of the present invention may be appreciated by referring to FIG. 2 which illustrates parallel rays of light incident on the end of a single optic fiber at an angle $\Theta$ to the axis A—A of the fiber. Because of the characteristics of the fiber, the light rays will emerge from the opposite end as a cone of rays having an apex angle 20. The emerging light rays are substantially symmetrically distributed about the axis A—A of the fiber. Thus, rather than the light rays all being parallel and directed in the same direction $\Theta$ relative to axis A—A, as they were at the left side of FIG. 2, they now are distributed throughout an axial cone of light. This effect will occur in each thin fiber of a tightly packed bundle of many fibers and thus will more uniformly distribute the emerging light about the axis of the bundle, irrespective of the direction from which the light rays were incident at the entrance end of the bundle. The diffuser plate now is more uniformly illuminated with an axially symmetrical light beam and it need not have exceedingly high diffusing ability in order to substantially uniformly illuminate the color filters. This means that the total light transmitted through the diffuser plate will be considerably greater. With the combined use of the bundle of optic fibers and the diffusion plate of this invention, approximately ten times the amount of light was transmitted to the color detectors as compared to a prior arrangement which used only a diffuser plate having greater diffusing power.

Figure 3:
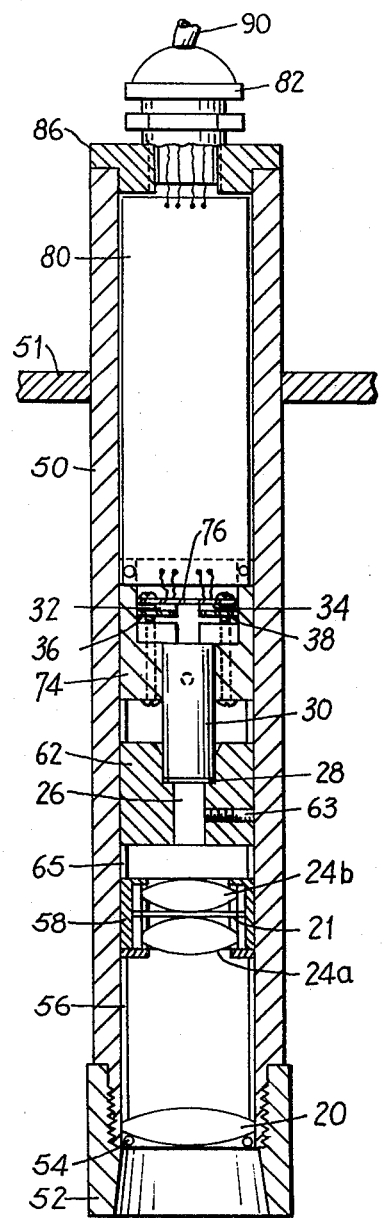
FIG. 3 is an illustration of apparatus constructed in accordance with the present invention.

A practical embodiment of an optical system and photodetectors constructed in accordance with this invention is illustrated in FIG. 3. The optical components, the photodetectors and some of the electronics associated with the produce grader are located within a tube 50 which has a mounting plate 51 secured thereto. A lens mount and hood 52 is threaded onto the left end of tube 50, and together with an O-ring 54 and spacer tube 56 hold objective lens 20 firmly in position. In this embodiment, the field lens is a double lens 24a, 24b positioned within a mounting ring 58. Field stop 21 is secured in mounting ring 58 between field lenses 24a, 24b. Field stop 21 is a long, narrow rectangular aperture to provide a field of view on conveyor 11 of approximately one inch by eleven inches, the longer dimension being in the direction of travel of the conveyor. It is to be understood that a separate field stop 21 is not essential to the optical system of this invention. In some instances the lens themselves may be relied upon to define the field of view.

A jacketed bundle of thin fiber optic light guides 26 is disposed within an axial aperture of mounting disc 62. Set screw 63 holds the jacketed bundle of optic fibers in place with its entrance end at or near the plane where the field lenses image the clear aperture of objective lens 20. The fiber optic bundle 24 was made from commercially available fibers which were 0.010 inch in diameter. The bundle was 0.28 inch in diameter with a 0.010 inch thick jacket. The bundle was 0.62 inch long. Both ends of the bundle were ground flat to a grainless finish. The arrangement of the fibers may be coherent or noncoherent.

A short spacer ring 65 separates mounting disc 62 from the field lens mounting ring 58.

The axial aperture in mounting disc 62 is enlarged at its right side and receives therein clear Plexiglass rod 30 which serves as a light pipe or guide. One or more thin sheets of plastic light diffusing material are secured to the left end of rod 30 to provide the diffuser plate 28. In practice, several layers of a drawing grade Mylar plastic material were used for diffuser plate 28. Any suitable light transmitting diffusing material may be used. The diameter of plastic rod 30 is greater than the diameter of the jacketed fiber optic bundle 26 to assure that as much as possible of the light transmitted through bundle 26 is received by and transmitted through rod 30.

The right end of light transmitting rod 30 is received within an axial aperture in a mounting block 74. The right end of the aperture in mounting block 74 is enlarged and supports a circular mounting board 76 which has the photodetectors 36 and 38 mounted thereon. Respective color filters 32 and 34 are positioned in front of the photodetectors. Filters 32 and 34 are held in place by means of set screws, as illustrated. The color filters and photodetectors are positioned substantially symmetrically with respect to the optic axis, which is the axis of tube 50.

A printed circuit board 80 which contains at least some of the electronics of the produce grader is secured to the right side of mounting block 74. Electrical connections are provided from photodetectors 32 and 34 to the printed circuit board. Other electrical leads on the right side of printed circuit board 80 are coupled to external circuitry through external connector 82 which is mounted on end cap 86.

In the described apparatus, light guide 30 is a one-half inch clear Plexiglass rod which serves only to transmit light from the diffuser plate 28 to the color filters 32 and 34. Its length is not critical but should be at least three times the diameter of the fiber optic bundle 26 to make the exit end of the bundle look more like a point source.

Objective lens 20 is an asymmetrical double-convex lens which is approximately 38mm in diameter and has a focal length of approximately 50mm. A suitable lens is obtainable from Ealing Optics Corporation, Cambridge, Massachusetts as stock no. 23-8618.

Field lenses 24a and 24b are identical asymmetrical double-convex lenses and are approximately 25mm in diameter and have a focal length of approximately 21mm. Suitable lenses may be obtained from Edmund Scientific Company, Barrington, New Jersey under stock no. 30542. The surfaces of the lenses having the greater curvature are adjacent each other.

Suitable photodetectors are obtainable from Seimens Corporation, Iselin, New Jersey as stock number BPX 91.

The spacing between the objective lens 20 and field stop 21 is approximately 57mm and the spacing from field stop 21 to the left face of fiber optic bundle 26 is approximately 17mm. The aperture dimensions of stop 21 were 0.08 × 0.875 inch. In the embodiment illustrated it was intended that the distance from objective lens 20 to an article of produce on a conveyor would be approximately 26 ± 6 inches.

In practice, the radiant energy illuminating the articles to be graded may be visible light, ultraviolet light, or infrared light. In practical applications using the apparatus described herein, tungsten lamps and fluorescent lamps may be used. In this description and in the accompanying claims, the use of the words light and color is intended to include radiant energy and frequency components thereof within any of the above spectra of light.

It also is to be understood that the light received by the optical system may be light that is transmitted through an article being graded instead of light reflected from the article.

It is understood by those skilled in the art that the field lens sometimes may be positioned very close to the image plane of the objective lens rather than precisely at the plane. Such common practice may be followed in the practice of this invention.

While a preferred embodiment of the invention has been illustrated and described, it is to be understood that alterations and modifications may be made to the described embodiment without departing from the scope of the present invention.

What is claimed is:

1. In apparatus for grading articles of agricultural produce according to frequency components of radiant energy received therefrom, the combination comprising
    objective lens means for focusing at an image plane radiant energy received from an object to be graded,
    a field stop at or near said image plane for defining a field of view that includes an article to be graded,
    a fiber optic bundle having first and second ends,
    field lens means adjacent said stop for forming an image onto one end of said fiber optic bundle,
    diffusing means at the second end of said bundle for diffusing radiant energy emerging from the other end of said fiber optic bundle,
    a plurality of photodetector means positioned to receive radiant energy emerging from said diffusing means, and
    a plurality of color filter means disposed in front of said photodetector means for passing to each of said photodector means a respective frequency component of said radiant energy.

2. The combination claimed in claim 1 wherein said bundle is an axially extending bundle of thin optical fiber light guides and said diffusing means, said filter means and said photodetector means are symmetrically positioned relative to the axis of said bundle.

3. The combination claimed in claim 2 wherein the image formed by the field lens onto the first end of said bundle is the image of the clear aperture of the objective lens.

4. In apparatus for grading an article according to the components of color in light received from the article, wherein the article is in a field of view of an optical system, said optical system comprising
    an objective lens for forming at an image plane an image of an article in said field of view,
    a field lens at or near said image plane for imaging the objective lens at a second plane,
    a fiber optic bundle having first and second ends, said first end being located at said second plane,
    diffusing means positioned at the other end of said bundle for diffusing light emitted from said bundle,
    a plurality of color filters symmetrically positioned relative to light emitted from said diffusing means to receive light from said diffusing means and each adapted to pass a respective color component of light incident thereon, and
    a plurality of photodetectors each positioned to receive a color component of light from a respective one of said filters.

5. A color detector for use in a color grader for receiving light from an article and for producing a plurality of electrical signals whose magnitudes are functions of respective color components of said light, said detector comprising
    an elongated tube,
    an objective lens disposed within said tube adjacent one end thereof for forming an image at an image plane within said tube,
    a field stop within said tube at or near the image plane of said objective lens for defining a field of view that will include said article,
    a field lens at or near said image plane for forming a second image at a second plane,
    a fiber optic bundle within said tube and having first and second ends,
    the first end of said bundle being positioned at or near said second plane, whereby said second image is focused on said first end of the bundle,
    diffuser means located adjacent the other end of the bundle to diffuse light emerging from the bundle,
    a plurality of color filters disposed within said tube and each adapted to pass a respective color component of light,
    means for directing light from the diffuser means onto said plurality of filters,
    a plurality of photodetector means disposed within said tube and each positioned to receive filtered light from a respective one of the color filters,
    each photodetector producing an electrical signal whose magnitude is a function of the respective colored light incident thereon,
    circuit board means positioned within said tube adjacent the opposite end thereof,
    said circuit board means having electronic circuit components thereon for operating on said electrical signals from said photodetectors,
    means connecting said photodetectors to circuit components on said circuit board means, and
    connector means for providing electrical connection from said circuit board means to the exterior of said tube.

6. The combination claimed in claim 5 wherein said diffuser means is in contact with the other end of said bundle.

7. The combination claimed in claim 5 wherein said second image formed by the field lens is the image of the objective lens.

8. The combination claimed in claim 5 wherein said means for directing light from the diffuser means is a light transmitting rod.

9. The combination claimed in claim 8 wherein said light transmitting rod has a diameter at least three times that of the fiber optic bundle.

* * * * *